United States Patent [19]

Welz et al.

[11] Patent Number: 4,692,373

[45] Date of Patent: Sep. 8, 1987

[54] LAMINATE BONDED BY ADHESION PROMOTING LAYER AND ADHESIVE LAYER

[75] Inventors: Martin Welz, Bad Durkheim; Bernhard Czauderna, Hirschberg; Karl-Heinz Stoffel, Worms, all of Fed. Rep. of Germany

[73] Assignee: BASF Aktiengesellschaft, Ludwigshafen, Fed. Rep. of Germany

[21] Appl. No.: 782,929

[22] Filed: Oct. 2, 1985

[30] Foreign Application Priority Data

Oct. 6, 1984 [DE] Fed. Rep. of Germany ....... 3436820

[51] Int. Cl.$^4$ .............................................. B32B 15/00
[52] U.S. Cl. ................................... 428/285; 428/286; 428/287; 428/424.8; 428/425.8
[58] Field of Search ............ 428/285, 286, 287, 424.8, 428/425.8

[56] References Cited

FOREIGN PATENT DOCUMENTS 1341500 12/1973 United Kingdom .

Primary Examiner—Marion C. McCamish
Attorney, Agent, or Firm—Keil & Weinkauf

[57] ABSTRACT

A laminate consists of a layer A of a polyolefin, reinforced with from 10 to 50% of glass fiber mats, and a metal layer D, which are bonded to one another by means of a mechanically adhesion-promoting layer B and an adhesive layer C. The adhesive is a thermoplastic polyurethane elastomer, preferably having a melting range of from 110° to 250° C. The laminates are used as automobile components, and as housings and containers.

8 Claims, No Drawings

LAMINATE BONDED BY ADHESION PROMOTING LAYER AND ADHESIVE LAYER

The present invention relates to a laminate which comprises a supporting layer A of a glass fiber matreinforced polyolefin and a relatively thin metal layer, which are bonded to one another by means of a mechanically adhesion-promoting layer B and an adhesive layer C.

Materials of glass mat-reinforced polyolefins are produced on an industrial scale and are used, for example, as automobile components and as housings and containers.

Polyolefins and metals usually adhere poorly to one another and it is therefore necessary to use adhesion promotors to bond the layers. In this connection, various methods have been used to date. Hot-melt adhesives have been used as adhesion promoters, or the bond has been produced by etching the metal surface or by means of solvent-containing adhesives.

These methods are relatively involved and expensive, the bond is in general not firm enough, and an additional adhesion-promoting layer may have an adverse effect on the mechanical and thermal properties of the laminate.

It is an object of the present invention to provide a laminate in which a layer A of a polypropylene is bonded very firmly to a reinforced layer D consisting of a ductile, deformable metal.

We have found that this object is achieved if the adhesion promoter used consists of a mechanically adhesion-promoting layer B together with an adhesive layer C based on a thermoplastic polyurethane elastomer.

The present invention relates to a laminate which comprises a layer A of a polyolefin, reinforced with from 10 to 50% by weight of glass fiber mats, and a layer D of a ductile metal, which are bonded to one another by means of a mechanically adhesion-promoting layer B and an adhesive layer C, wherein the adhesive is a thermoplastic polyurethane elastomer.

The supporting layer A consists of a glass matreinforced polyolefin and may be from 0.5 to 8, preferably from 1 to 4, mm thick. Polyolefins are the homopolymers and copolymers of ethylene and of propylene with copolymerizable olefinically unsaturated compounds. Preferred polyolefins are polyethylene having a density of from 0.890 to 0.965 g/cm$^3$ (according to DIN 53,479) and a melt flow index of from 0.1 to 20 g/10 min (according to ASTM D 1238-65 T, at 190° C. and under a load of 2.16 kg), and polypropylene having a density of from 0.80 to 0.91 g/cm$^3$ and a melt flow index of from 0.1 to 80 g/10 min (according to ASTM-D, 1238-65 T, at 230° C. and under a load of 2.16 kg).

In order to increase their impact strengths, the polyolefins can, if required, also contain from 1 to 20% by weight of conventional synthetic rubbers or block copolymers of styrene and dienes. A particularly useful polyolefin is isotactic polypropylene, which contains from 3 to 10% by weight of a polypropylene which is soluble in xylene which has been boiled and then cooled again to room temperature, the weight ratio of polypropylene to xylene in the resulting solution being 5:95.

The polyolefins are reinforced with from 10 to 50, preferably from 20 to 40, % by weight of glass fiber mats. In addition to these, the polyolefin materials may also contain relevant conventional flameproofing agents, agents for improving the impact resistance, such as low density polyethylene, stabilizers or polymer waste.

Particularly suitable metals for layer D are soft metals, such as aluminum, copper, lead, tin, magnesium or alloys of these. The metal foils are from 10 to 1,000, preferably from 20 to 200 μm thick and have an elongation at break of from 10 to more than 25%. The weight of metal in the novel laminate is low. Since it does not act as a support, the metal can be in a soft, ductile state so that it is also possible to convert the claimed laminate to three-dimensional components.

The metal foils may be applied on one side or both sides. They fulfil a very large variety of functions on a component, and may be both decorative and functional. They can, for example, render a component conductive, act as a shield against electromagnetic rays or (in antennae) focus these rays, or reflect heat radiation and thus protect the component from overheating.

The mechanically adhesion-promoting layer B preferably consists of a nonwoven fabric. Suitable fabrics are spunbonded fabrics or card webs consisting of synthetic fibers, for example those composed of linear polyesters, such as polyethylene terephthalate, of polyolefins, such as polyethylene and polypropylene, and of polyvinyl chloride, polyacrylonitrile, nylon or blends of the stated fibers.

Glass fiber mats are also very suitable. The nonwoven fabrics may be consolidated thermally or mechanically or by means of a binder. Their weight per unit area may be from 25 to 200 g.m$^{-2}$.

According to the invention, the adhesive C is a thermoplastic polyurethane elastomer, preferably having a melting range of from 110° to 250° C., in particular from 180° to 210° C. It is fundamentally different from the conventional reactive polyurethane adhesives which consist of two components, a polyisocyanate and a polyol, which react with one another at from room temperature to not more than 80° C., generally in the presence of a catalyst.

The thermoplastic polyurethane elastomer is a single-component adhesive, which is used as such. It is usually prepared by reacting (a) organic diisocyantes with (b) polyhydroxy compounds having molecular weights of from 500 to 8,000 and (c) chain extenders having molecular weights of from 60 to 400, in the presence of (d) catalysts and in the presence or absence of (e) assistants and/or (f) additives.

(a) Examples of suitable organic diisocyanates (a) are aliphatic, cycloaliphatic and, preferably, aromatic diisocyanates. Specific examples are aliphatic diisocyanates, such as hexamethylene diisocyanate, cycloaliphatic diisocyanates, such as isophorone diisocyanate, cyclohexane 1,4-diisocyanate or 1-methylcyclohexane, 2,4-diisocyanate or 2,6-diisocyanate and the corresponding isomer mixtures, dicyclohexylmethane, 4,4'-, 2,4'- and 2,2'-diisocyanate and the corresponding isomer mixtures, and preferably aromatic diisocyanates, such as toluylene 2,4-diisocyanate, mixtures of toluylene 2,4- and 2,6-diisocyanate, diphenylmethane 4,4'-, 2,4'- and 2,2'-diisocyanate, mixtures of diphenylmethane 2,4'- and 4,4'-diisocyanate, urethane-modified liquid diphenylmethane 4,4'- and/or 2,4'-diisocyanates and naphthylene 1,5-diisocyanate. Hexamethylene diisocyanate, isophorone diisocyanate, diphenylmethane diisocyanate isomer mixtures containing more than 96% by weight of diphenylmethane 4,4'-diisocyanate, and in particular diphenylmethane 4,4'-diisocyanate and naphthylene 1,5-diisocyanate are preferably used.

(b) Preferred high molecular weight polyhydroxy compounds (b) having molecular weights of from 500 to 8,000 are polyesterols, but other hydroxyl-containing polymers, e.g. polyacetals, such as polyoxymethylenes, and especially water-insoluble formals, e.g. polybutanediol formal and polyhexanediol formal, and polycarbonates, in particular those prepared from diphenyl carbonate and hexane-1,6-diol by transesterification, are also suitable. The polyhydroxy compounds must be predominantly or entirely linear, i.e. must be difunctional with regard to the isocyanate reactions. The stated polyhydroxy compounds can be used as individual components or in the form of mixtures.

Suitable polyetherols are prepared by reacting one or more alkylene oxides where alkylene is of 2 to 4 carbon atoms with an initiator molecule which contains two bonded active hydrogen atoms. Examples of alkylene oxides are ethylene oxide, 1,2-propylene oxide, epichlorohydrin and 1,2- and 2,3-butylene oxide. Ethylene oxide and mixtures of propylene oxide and ethylene oxide are preferably used. The alkylene oxides can be used individually, alternately one after the other or as mixtures. Examples of suitable initiator molecules are water, aminoalcohols, such as N-alkyldiethanolamines, e.g. N-methyldiethanolamine, and diols, such as ethylene glycol, 1,3-propylene glycol, butane-1,4-diol and hexane-1,6-diol. If necessary, mixtures of initiator molecules may also be used. Other suitable polyetherols are the hydroxycontaining polymers of tetrahydrofuran.

Preferably used compounds are hydroxyl-containing polytetrahydrofuran and polyetherols obtained from propylene oxide and ethylene oxide, in which more than 50%, preferably from 60 to 80%, of the OH groups are primary hydroxyl groups and some or all of the ethylene oxide is present as a terminal block.

Such polyetherols can be obtained by, for example, polymerizing first the propylene oxide and then the ethylene oxide with the initiator molecule, or first copolymerizing a mixture of the total amount of propylene oxide with some of the ethylene oxide and then polymerizing on the remainder of the ethylene oxide, or polymerizing, by a stepwise procedure, first some of the ethylene oxide, then all the propylene oxide and thereafter the remainder of the ethylene oxide with the initiator molecule.

The essentially linear polyetherols possess molecular weights of from 500 to 8,000, preferably from 600 to 6,000, in particular from 800 to 3,500. They may be used either individually or in the form of a mixture with one another.

Suitable polyesterols can be prepared from, for example, dicarboxylic acids of 2 to 12 carbon atoms and polyhydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures, for example in the form of a mixture of succinic acid, glutaric acid and adipic acid. In preparing the polyesterols, it may be advantageous if, instead of the carboxylic acids, the corresponding carboxylic acid derivatives, such as carboxylates where the alcohol radical is of 1 to 4 carbon atoms, carboxylic anhydrides or carboxylic acid chlorides, are used. Examples of polyhydric alcohols are glycols of 2 to 16 carbon atoms, such as ethylene glycol, diethylene glycol, butane-1,4-diol, pentane-1,5-diol, hexane-1,6-diol, decane-1,10-diol, 2,2-dimethylpropane-1,3-diol and dipropylene glycol. The polyhydric alcohols can be used alone or, where appropriate, as a mixture with one another, depending on the properties desired.

Other suitable compounds are esters of carbonic acid with the stated diols, in particular those of 4 to 6 carbon atoms, such as butane-1,4-diol and/or hexane-1,6-diol, condensates of ω-hydroxycarboxylic acids, e.g. ω-hydroxycaproic acid, and preferably polymers of lactones, for example unsubstituted or substituted ω-caprolactones.

Preferably used polyesterols are ethanediol polyadipates, butane-1,4-diol polyadipates, ethanediol butanediol polyadipates, hexane-1,6-diolneopentylglycol polyadipates, hexane-1,6-diol butane-1,4-diol polyadipates and polycarprolactones.

The polyesterols possess molecular weights of from 500 to 6,000, preferably from 800 to 3,500.

(c) Preferred chain extenders (c) having molecular weights of from 60 to 400, preferably from 60 to 300, are aliphatic diols of 2 to 12, preferably 2, 4 or 6, carbon atoms, e.g. ethanediol, hexane-1,6-diol, diethylene glycol, dipropylene glycol and in particular butane-1,4-diol. Other suitable compounds are diesters of terephthalic acid with glycols of 2 to 4 carbon atoms, e.g. bis(ethylene glycol) terephthalate or bisbutane-1,4-diol terephthalate, hydroxyalkylene ethers of hydroquinone, e.g. 1,4-di(hydroxyethyl)-hydroquinone, (cyclo)aliphatic diamines, e.g. isophoronediamine, ethylenediamine, 1,2- or 1,3-propylenediamine, N-methylpropylene-1,3-diamine or N,N'-dimethylethylenediamine, and aromatic diamines, e.g. 2,4- and 2,6-toluylenediamine and 3,5-diethyl-2,4- and -2,6-toluylenediamine, and primary ortho-di-, tri- and/or tetraalkyl-substituted 4,4'-diaminodiphenylmethane.

To adjust the hardness and melting point of the thermoplastic polyurethane, the molar ratios of components (b) to (c) may be varied within relatively wide limits. Molar ratios of polyhydroxy compounds (b) to chain extenders (c) of from 1:1 to 1:12, in particular from 1:1.8 to 1:4.4, have proven useful, the hardness and melting point of the thermoplastic polyurethane increasing with increasing diol content.

To prepare the thermoplastic polyurethane, the components (a), (b) and (c) are reacted, in the presence of a catalyst (d) and in the presence or absence of assistants (e) and/or additives (f), in amounts such that the ratio of the number of equivalents of NCO groups of the diisocyanate to the sum of the number of equivalents of hydroxyl groups or hydroxyl and amino groups of components (b) and (c) is from 1:0.85 to 1:1.20, preferably from 1:0.95 to 1:1.05, and in particular about 1:1.02.

(d) Suitable catalysts which in particular accelerate the reaction between NCO groups of the diisocyanates (a) and the hydroxyl groups of components (b) and (c) are the conventional tertiary amines known from this prior art, e.g. triethylamine, dimethylcyclohexylamine, N-methylmorpholine, N,N'-dimethylpiperazine, diazabicyclo[2,2,2]octane and the like and in particular organometallic compounds, such as titanates, iron compounds, tin compounds, e.g. tin diacetate, tin dioctoate, tin laurate or the dialkyltin salts of aliphatic carboxylic acids, such as dibutyltin diacetate, dibutyltin dilaurate or the like. The catalysts are usually employed in amounts of from 0.001 to 0.1 part per 100 parts of polyhydroxy compound.

In addition to catalysts, it is also possible to incorporate assistants (e) and/or additives (f) into the components. Examples are lubricants, inhibitors, stabilizers against hydrolysis, light stabilizers, heat stabilizers, or stabilizers against discoloration, flameproofing agents, dyes, pigments, inoganic and/or organic fillers and reinforcing agents.

The abovementioned assistants and additives are described in more detail in the specialist literature, for example the monograph by J. H. Saunders and K. C. Frisch, "High Polymers", Volume XVI, Polyurethane, Parts 1 and 2, Interscience Publishers 1962 and 1964, or German Laid-Open Application DOS No. 2,901,774.

In a preferred process for the preparation of the novel laminate, the metal foil is first provided with the adhesion promoter, and this laminate is then applied onto the base consisting of a glass mat-reinforced polyolefin.

To do this, the hot-melt adhesive C is preferably melted in an extruder and applied continuously, via a slot die, onto the degreased and preheated metal foil. The fabric B is then pressed into the still molten layer with the aid of a pair of rollers, and the laminate is passed over cooling rollers and thus fixed. The thickness of the layer of hot-melt adhesive C should be adjusted so that no more than half the fabric B is embedded in the layer C.

The foil coated with the adhesion promoter is then laminated with one side or both sides of the base A. This can be carried out continuously, for example during preparation of the base, by feeding the metal foil together with the base into the press, with the adhesion promoter-coated side facing the base. During this procedure, the fabric becomes anchored in the molten polyolefin layer. However, it is also possible to effect lamination of the metal foil during production of the molding. To do this, the base is heated to above the melting point of the matrix, the coated metal foil, if necessary also heated, is placed in position, and the layers are pressed together in a mold.

In another process for the preparation of the laminates, coating of the metal foil with the hot-melt adhesive and the fabric, production of the base from glass mats and polyolefin melt and lamination of the two layers are carried out in one operation. To do this, the metal foil is coated with the hot-melt adhesive and, while the latter is still in a molten state, is passed together with the fabric into the press, into which the preheated glass fiber mats and the polyolefin melt are drawn at the same time.

In principle, it is also possible to apply the adhesive from solution, but this procedure is more involved since the solvent then has to be evaporated.

In another embodiment, the adhesive C is sprinkled on in the form of a powder or laid on in the form of a prepared film and then melted. The metal foil/adhesive laminate is then combined with a nonwoven fabric as layer B and is fixed. These methods involve prefabrication (powder or film) and are only reasonable when an extruder is not available.

The novel adhesion promoters B and C give an excellent adhesive bond between the layers A and D at both room temperature and 90° C., this bond being retained even after prolonged storage of the laminate. Another advantage is the simple method of processing.

The novel laminates can be processed by various methods, such as vacuum or pressure forming, folding or bending, but are preferably pressed to give shaped articles.

In the Examples, parts and percentages are by weight.

EXAMPLE 1

An 80 $\mu$m thick layer of a polyurethane elastomer having a melting range of from 118° to 210° C. and consisting of a butanediol polyadipate, butane-1,4-diol and diphenylmethane 4,4'-diisocyanate is extruded via a slot nozzle onto a soft, 60 $\mu$m thick aluminum foil which has an elongation at break of about 15% and has been preheated to about 120° C. A spunbonded fabric of polyethylene terephthalate fibers which has been consolidated by needle punching and has a weight per unit area of 100 g/m$^2$ is pressed gently into the still liquid melt layer with the aid of rollers heated at about 80° C., and is then fixed by means of cooling rollers and taken off.

In a second operation, the base, consisting of an isotactic polypropylene reinforced with 30% of continuous glass fiber mats, is heated to 210° C., the laminated aluminum foil, which has been heated to about 100° C., is laid on the base with the fabric side facing the base, and the base and the foil together are pressed in a mold at about 70° C. under a pressure of 50 bar and then cooled. Although the mold is slightly curved, the aluminum foil is not torn off. The adhesion is 5.5 N/mm, measured in the peel test by means of reels (DIN 53,289).

EXAMPLE 2

A 50 $\mu$m thick layer of a polyurethane elastomer is applied onto a soft, 40 $\mu$m thick copper foil and coated with a 30 g/m$^2$ glass mat, these tests being carried out as described in Example 1. This coated foil is laminated with the base directly during the preparation of the latter, the layers passing together through the continuous pressing zone and thus being cooled under pressure. The base is formed by impregnating two glass mats, preheated to 200° C., with a molten strip of isotactic polypropylene.

We claim:

1. A laminate comprising a layer A of a polyolefin, reinforced with from 10 to 50% by weight of glass fiber mats, and a layer D of a metal, which are bonded to one another by means of a mechanically adhesion-promoting layer B and an adhesive layer C, wherein the adhesive is a thermoplastic polyurethane elastomer, wherein the adhesion promoting layer B is a non-woven fabric which is anchored in the polyolefin layer.

2. A laminate as defined in claim 1, wherein the polyurethane elastomer has a melting range of from 110° to 250° C.

3. A laminate as defined in claim 1, wherein the mechanically adhesion-promoting layer is a spunbonded fabric or card web consisting of plastic fibers.

4. A laminate as defined in claim 1, wherein the mechanically adhesion-promoting layer consists of a glass fiber mat.

5. A laminate as defined in claim 1, wherein the metal layer D consists of a ductile, deformable metal having an elongation at break of not less than 10%.

6. A laminate as defined in claim 1, wherein the polyurethane elastomer has a melting range of from 180° to 210° C.

7. A laminate as defined in claim 1, wherein the mechanically adhesion-promoting layer is a spunbonded fabric or card web consisting of polyester fibers.

8. A laminate as defined in claim 1, wherein the metal layer D consists of aluminum, copper or steel.

* * * * *